United States Patent [19]

Lopez

[11] 4,191,960

[45] Mar. 4, 1980

[54] PHASED ARRAY ANTENNA WITH REDUCED PHASE QUANTIZATION ERROR

[75] Inventor: Alfred R. Lopez, Commack, N.Y.

[73] Assignee: Hazeltine Corporation, Greenlawn, N.Y.

[21] Appl. No.: 872,976

[22] Filed: Jan. 27, 1978

[51] Int. Cl.[2] .......................... H01Q 1/50; H04B 7/00

[52] U.S. Cl. .............................. 343/854; 343/100 SA

[58] Field of Search .......................... 343/100 SA, 854

[56] References Cited

U.S. PATENT DOCUMENTS 3,387,301 6/1968 Blass et al. .................... 343/100 SA 3,999,182 12/1976 Moeller et al. ...................... 343/854

OTHER PUBLICATIONS

Merrill I. Skolnik, Radar Handbook (New York: McGraw-Hill, 1970), pp. 11-35 through 11-43.

*Primary Examiner*—Paul L. Gensler

*Assistant Examiner*—Harry E. Barlow

[57] ABSTRACT

Phase quantization errors in a phased array antenna are reduced by providing phase control signals which approximate ideal phase functions for symmetrical pairs of elements having an average phase value which is displaced from a nominal phase quantization value by one-quarter the smallest phase step.

6 Claims, 9 Drawing Figures

PHASED ARRAY ANTENNA WITH REDUCED PHASE QUANTIZATION ERROR

BACKGROUND OF THE INVENTION

This invention relates to phased array antenna systems, and particularly to reduction of phase quantization errors in phase array systems used for direction finding applications.

In his copending application, Ser. No. 872,525 filed Jan. 26, 1978, Richard F. Frazita describes a phased array antenna having reduced phase quantization errors. Pertinent portions of that application are incorporated herein by reference. The Frazita application discloses an array antenna wherein one element in each pair of elements on an array aperture is provided with a phase adjustment in the coupling network. The phase adjustment has a phase length which is equal to one-half the smallest phase step of the digital phase shifters used in the coupling network. The phase adjustment results in an offset in the radiation angles at which symmetrically located phase shifters change state. This offset of radiation angles effectively reduces the maximum phase quantization error from an amount equal to the value of the smallest phase shifter step to an amount equal to one-half the valve of the smallest phase shifter step.

It is an object of the present invention to provide a phased array antenna wherein phase quantization errors are reduced without the use of phase adjustments in the antenna coupling network.

SUMMARY OF THE INVENTION

In accordance with the invention, there is provided a phased array antenna system which includes an aperture having a plurality of antenna elements symmetrically arranged with respect to a selected reference point on the aperture. Coupling means are provided for supplying wave energy signals to the elements. The coupling means include digital phase shifters for varying the phase of wave energy signals in discrete phase steps in response to supplied phase control signals. The phase length of the coupling means is selected to cause wave energy signals to be supplied to all of the elements with a phase which is approximately an integral multiple of the smallest phase step of the phase shifters from a selected nominal phase value. Means are provided for supplying phase control signals to the phase shifters to cause wave energy signals supplied to the elements to have a phase which approximates an ideal phase function of a desired radiation angle for each element. The ideal phase function is selected to cause reinforcement of radiation from the elements in the desired angle, and the functions for symmetrically arranged element pairs have an average value for any radiation angle which is displaced from the nominal phase value by a selected phase displacement, to cause the phase difference between the signals supplied to the elements of each pair to be approximately within one-half the smallest phase control step from the difference between the phase functions for the elements.

The phase displacement preferably has a magnitude of one-quarter the smallest phase step. The ideal phase functions for the elements may be the sum of a nominal phase function, which causes reinforcement of wave energy signals in a nominal radiation direction, a beam steering function, and a constant phase displacement. Where the nominal radiation angle is the direction perpendicular to a plane containing the array elements, the nominal phase function is an equal phase value for all elements. Where the nominal radiation angle is different from the direction perpendicular to the plane containing the elements, the nominal phase function for each element is proportional to the distance of that element from the reference point on the aperture plane, as measured in a perpendicular plane containing the desired radiation angle and passing through the reference point. The beam steering function is also proportional to the distance of each element from the reference point, as measured in the perpendicular plane.

For a better understanding of the present invention, together with other and further objects, reference is made to the following description, taken in accordance with the accompanying drawings, and its scope will be pointed out in the appended claims.

DESCRIPTION OF THE INVENTION

Figure 1:
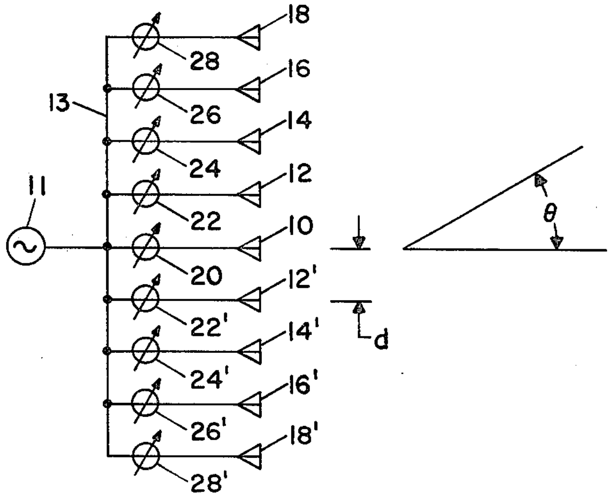
PRIOR ART FIG. 1
FIG. 1 is a schematic representation of a phased array antenna system.

FIG. 1 is a schematic representation of a phased array antenna system. The antenna includes radiating elements 10, 12, 12', 14, 14', 16, 16', 18, and 18' which are arranged in a line on opposite sides of a reference point at which central element 10 is located. Each of the elements in the antenna system is connected to a transmitter 11 by a coupling network 13 which includes individual phase shifters 20 through 28 and 22' through 28'. Each of the phase shifters is a digital phase shifter, which changes the phase of wave energy signals in discrete phase steps in response to phase control signals supplied to the phase shifters in a manner which is well known in the art. By proper setting of the phase shifters using phase control signals, it is possible to cause the direction of radiation from the FIG. 1 antenna to change to different angles $\theta$.

Figure 1A:
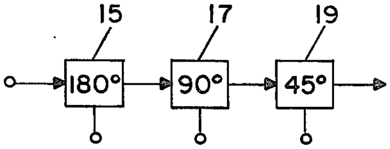
PRIOR ART FIG. 1A
FIG. 1A illustrates a typical digital phase shifter of the type useful in the FIG. 1 antenna.

FIG. 1A illustrates a typical digital phase shifter of the type which may be used in the FIG. 1 antenna. The phase shifter includes three phase shifting bits 15, 17, and 19, which change the phase of wave energy signals in discrete phase steps. The FIG. 1A phase shifter is a three bit phase shifter which changes wave energy signals in binary fractions of 360°, that is 180°, 90°, and 45°. The smallest bit of the FIG. 1 phase shifter is 45°, and consequently this is the smallest increment by which the total phase of signals passing through the phase shifter may be changed. Thus, if the phase shifter is set as closely as possible to a desired phase value, it is possible that the phase shifter may have a phase which deviates from the desired phase value by as much as ±22.5°.

Figure 2:
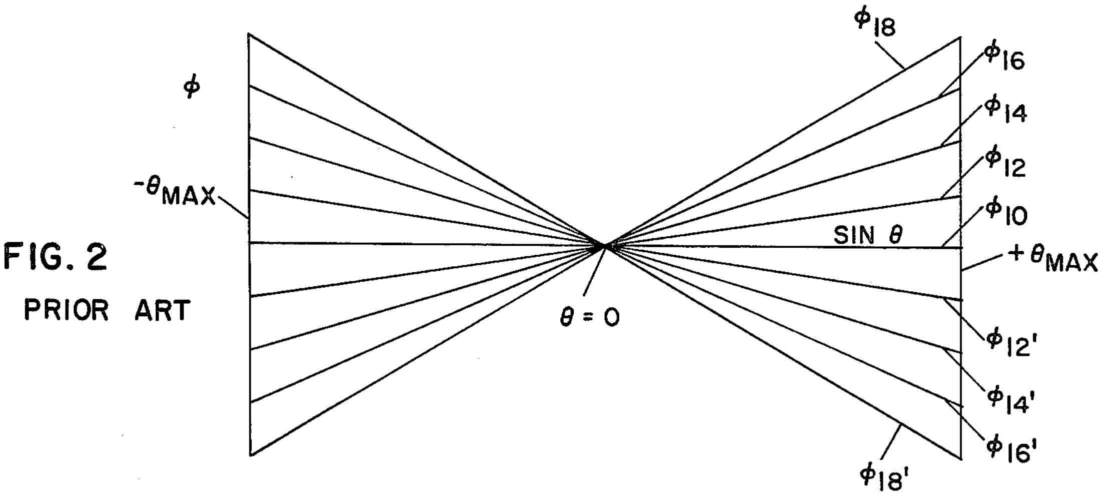
FIG. 2 PRIOR ART
FIG. 2 illustrates a set of ideal phase functions for the elements of the FIG. 1 antenna system.

FIG. 2 illustrates a set of phase functions, $\phi_{10}$, $\phi_{12}$, etc., for the antenna of FIG. 1. Each phase function represents the ideal phase of wave energy signals supplied to an element 10, 12, etc., in order for the radiation from the FIG. 1 antenna to be reinforced in a desired radiation angle $\theta$. For convenience, the value of the phase of signals supplied to all elements for $\theta=0°$ has been selected to be zero.

Figure 3:
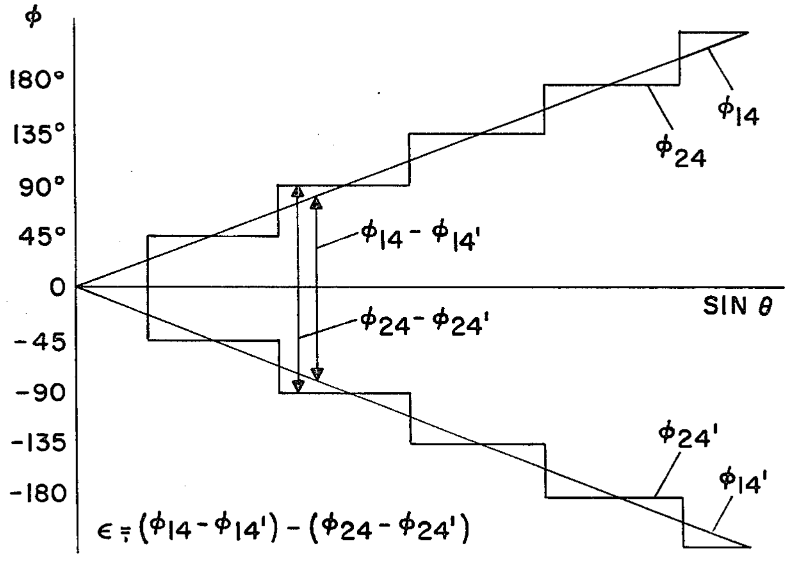
FIG. 3 (PRIOR ART)
FIG. 3 illustrates ideal phase functions and phase quantization for a pair of elements in the FIG. 1 antenna in accordance with the prior art.
Figure 4:
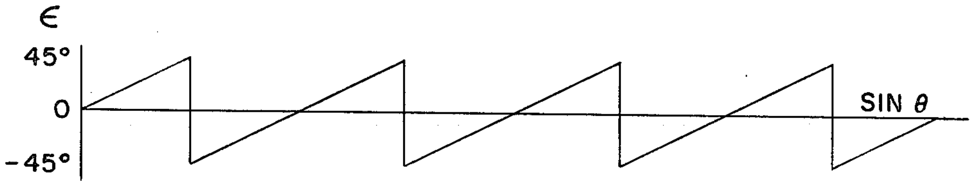
FIG. 4 (PRIOR ART)
FIG. 4 illustrates phase quantization errors in accordance with the prior art.

FIG. 3 illustrates the prior art phase quantization for phase shifters 24, and 24' to approximate ideal phase functions $\phi_{14}$ and $\phi_{14'}$. Only positive values of $\theta$ are illustrated since the ideal functions are symmetrical. Because the value of the phase of the phase shifters can be changed only in steps of 45°, or integral multiples of 45°, the actual phase difference between the phase of signals supplied to elements 14 and 14', indicated as $\phi_{24}$ and $\phi_{24'}$, is different than the ideal phase difference by as much as ±45°. This phase error, $\epsilon$ is plotted in FIG. 4 as a function of the sine of the scan angle $\theta$.

Figure 5:
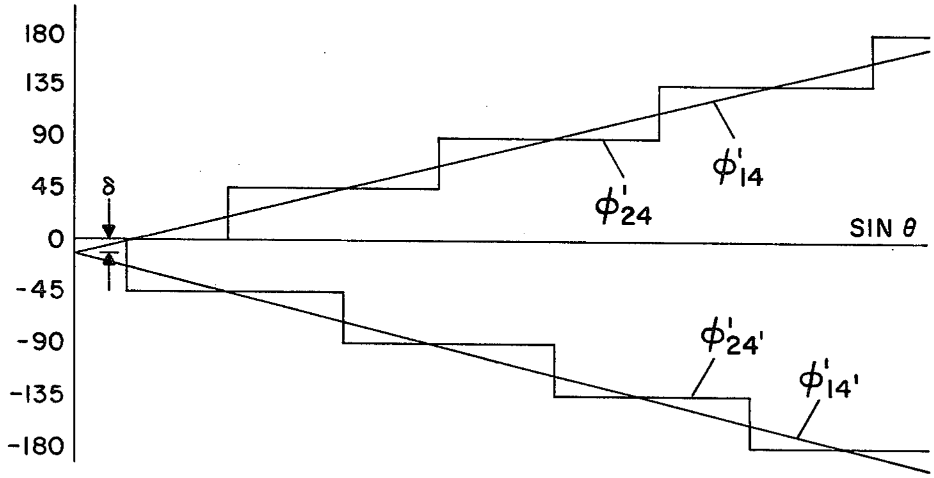
FIG. 5 illustrates ideal phase functions and phase quantization for a pair of elements in the FIG. 1 antenna in accordance with the present invention.

In accordance with the present invention, it has been discovered that by modifying the ideal phase functions, which are used to select the phase control signals, for the antenna phase shifters, it is possible to significantly reduce the phase quantization error $\epsilon$. FIG. 5 is a plot illustrating modified ideal functions $\phi'_{14}$ and $\phi'_{14'}$ which are displaced from the nominal phase for 0° scan angle by an amount $\delta$. The average phase value for symmetrical element pairs is similarly displaced for all scan angles. As a result of this average phase displacement of the ideal phase functions from an amount which is an integral multiple of the smallest phase step of the phase shifters, the phase control signals supplied to phase shifters 24 and 24' cause these phase shifters to change phase state at different values of scan angle. Thus, as shown in FIG. 5, phase shifter 24 changes state at distinctly different values than phase shifter 24'. This offset of the change of phase state is optimum when the phase displacement $\delta$ has a magnitude of one-quarter the smallest phase shifter step. The displacement may be in the positive or negative direction from a nominal phase value corresponding to one of the available phase shifter states.

Figure 6:
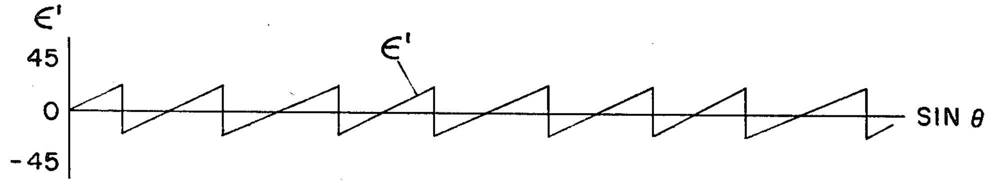
FIG. 6 illustrates phase quantization errors in accordance with the present invention.

FIG. 6 illustrates the phase quantization error $\epsilon'$ which results from the use of the ideal phase functions of FIG. 5. It may be easily seen that the maximum amplitude of phase quantization errors is 22.5°. In addition, the phase error curve has double the periodicity of the prior art phase quantization error shown in FIG. 4.

Figure 7:
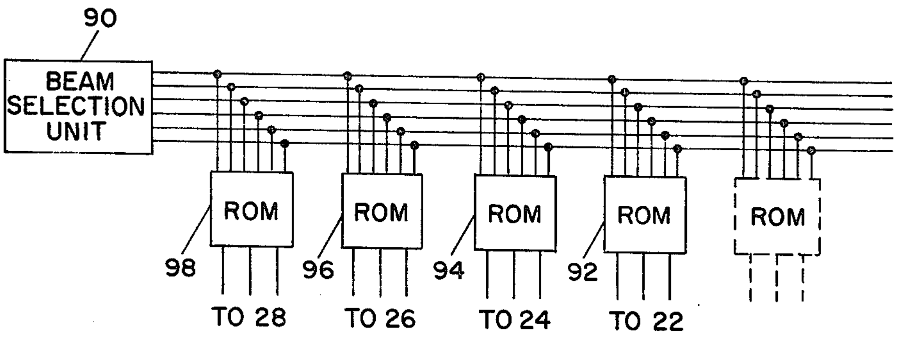
FIG. 7 illustrates an apparatus for providing phase control signals to the phase shifters of the FIG. 1 antenna.

It will be recognized that the improvement according to the invention, which reduces the phase quantization error is easily implemented by modifying the phase control signal generator. Thus, if the phase control signals originate in a read only memory device, such as illustrated in FIG. 7, the improvement in phase quantization error can be achieved merely by changing the values in read only memories 92, 94, 96, 98, etc., so that the phase control signals, supplied in response radiation direction signals from beam selection unit 90, approximate functions which are displaced from a nominal phase value by an amount $\delta$.

While in most applications the array antenna has a nominal radiation direction which is broadside to the aperture ($\theta=0°$), it is possible to arrange an array to have an off-center nominal radiation value by varying the phase lengths of the coupling network. Thus, the phase of wave energy signals supplied to the elements when all phase shifters are set at equal value may be a linear phase slope on the antenna aperture corresponding to a nominal radiation angle other than zero. The ideal function according to the invention can be computed from this "nominal" phase function, a beam steering function, proportional to element distances from a reference point on the aperture measured in the plane of beam steering and proprotional to the difference between the sine of the desired radiation angle and the nominal radiation angle, and the phase displacement $\delta$. When the nominal radiation angle is zero, the nominal phase function is also zero.

Figure 8:
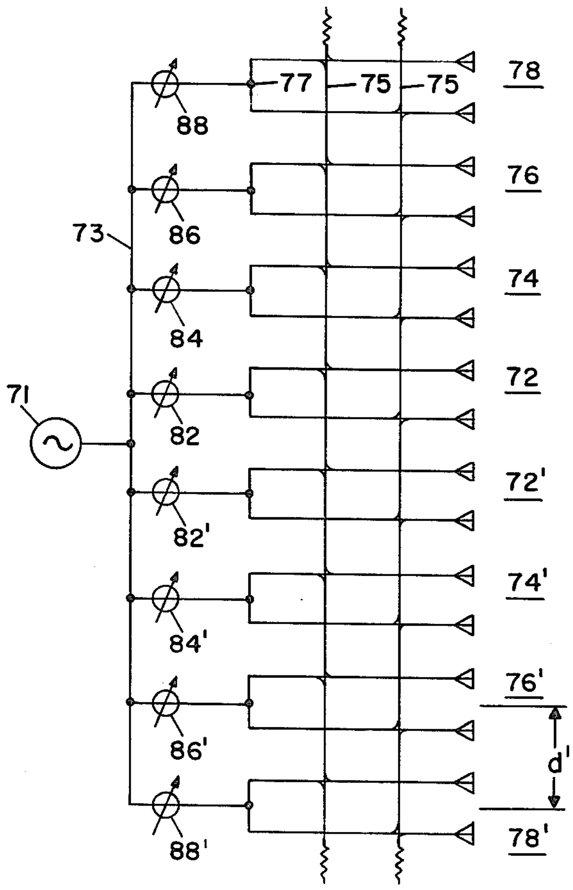
FIG. 8 illustrates an antenna system having a large effective element spacing, in which the present invention is particularly advantageous.

The improved phase quantization error control technique according to the invention is advantageously used in a phased array of the type shown in FIG. 8, wherein there is more than one radiating element for each phase shifter. The FIG. 8 array is of the type described in U.S. Pat. No. 4,041,501 to Frazita. In accordance with that patent, elements are arranged in element groups 72, 74, 76, etc., and supplied with signals from a coupling network 73 which has a single phase shifter 82, 84, 86, etc., corresponding to each element group. The result is a rather large effective element spacing d'. Coupling networks 75 interconnect the elements and cause shaping of the effective element pattern so that radiation grating lobes are suppressed. An array of this type, because of the large effective element spacing d', is susceptible to pointing errors arising out of phase quantization errors. The improvement according to the invention, which reduces phase quantization errors, is therefore particularly effective in antennas of this type for reducing the resulting antenna pointing errors.

While the invention has been described with respect to transmitting antennas, those skilled in the art will recognize that such antennas are reciprocals and the invention is equally applicable to receiving antennas. It is therefore intended that the appended claims apply with equal force to antennas designed for transmitting or receiving signals.

While there have been described what are believed to be the preferred embodiments of the invention, those skilled in the art will recognize that other and further modifications may be had thereto without departing from the true spirit of the invention, and it is intended to claim all such embodiments as fall within the true scope of the invention.

I claim:

1. A phased array antenna system, comprising:

an aperture having a plurality of antenna elements symmetrically arranged with respect to a selected reference point on said aperture;

coupling means for supplying wave energy signals to said elements, said coupling means including digital phase shifters for varying the phase of said wave energy signals in discrete phase steps in response to supplied phase control signals, the phase length of said coupling means being selected to cause said wave energy signals to be supplied to all of said elements with a phase which is approximately an integral multiple of the smallest phase step of said phase shifters from a selected nominal phase value;

and means for supplying said phase control signals to said phase shifters to cause wave energy signals supplied to said elements to have a phase which approximates an ideal phase function of a desired radiation angle for each element, said ideal phase functions being selected to cause reinforcement of radiation from said elements in said desired angle and said ideal phase functions for symmetrically arranged element pairs having an average value for any radiation angle which is displaced from said nominal phase value by a selected phase displacement to cause the phase difference between signals supplied to the elements of each pair to be approximately within one-half said smallest phase step from the difference between said phase functions for said elements.

2. A phased array as specified in claim 1 wherein said phase displacement has a magnitude of approximately one-quarter said smallest phase step.

3. A phased array antenna system, for radiating wave energy signals in a selected radiation angle, comprising:

an aperture comprising a plurality of antenna elements symmetrically arranged on an aperture plane with respect to a selected reference point;

coupling means for supplying wave energy signals to said elements, said coupling means including digital phase shifters for varying the phase of wave energy signals in discrete phase steps in response to supplied phase control signals, the phase length of said coupling means being selected to cause said wave energy signals to be supplied to said elements with a phase which is an integral multiple of the smallest phase step of said phase shifters from a selected nominal phase function, said nominal phase function corresponding to phase values which cause phase reinforcement of the radiation from said elements in a nominal radiation direction;

and means for supplying phase control signals to said phase shifters to cause the phase of wave energy signals supplied to said elements to have a phase which approximates an ideal phase function, said ideal phase function comprising the sum of said nominal phase function, a beam steering function computed from said selected radiation angle, and a selected constant phase displacement, said constant phase displacement being selected to cause the phase differences between signals supplied to the elements of each pair of symmetrical elements to be within approximately one-half said smallest phase step from the difference between said ideal functions for said elements for any desired radiation angle.

4. A phased array as specified in claim 3 wherein said nominal phase function comprises equal phase for all of said elements.

5. A phased array as specified in claim 3 wherein said nominal and selected radiation angles are angles within a plane perpendicular to said aperture, and wherein said nominal phase function is a function proportional to the distance of each element from said reference point measured in said plane, and wherein said beam steering function is a function proportional to the distance of each element from said reference point measured in said plane and proportional to the difference between the sine of said selected radiation angle and said nominal radiation angle, said angles being measured in said perpendicular plane from a line perpendicular to said aperture plane.

6. A phased array as specified in claim 3 wherein said constant phase displacement has a magnitude of one-quarter said smallest phase step.

* * * * *